United States Patent [19]

Kanno

[11] Patent Number: 5,366,394
[45] Date of Patent: Nov. 22, 1994

[54] SPEED DETECTING SYSTEM FOR MARINE PROPULSION UNIT

[75] Inventor: Isao Kanno, Hamamatsu, Japan

[73] Assignee: Sanshin Kogyo Kabushiki Kaisha, Hamamatsu, Japan

[21] Appl. No.: 982,834

[22] Filed: Nov. 30, 1992

[30] Foreign Application Priority Data

Dec. 5, 1991 [JP] Japan .................. 3-348333

[51] Int. Cl.⁵ ........................ H01H 35/24
[52] U.S. Cl. .................. 440/2; 440/900; 73/187
[58] Field of Search .......... 440/2, 900; 73/521, 73/524, 182, 183, 184, 185, 186, 187

[56] References Cited

U.S. PATENT DOCUMENTS

| | | | |
|---|---|---|---|
| 4,119,819 | 10/1978 | McGuire | 73/521 |
| 4,206,637 | 6/1980 | Pankonien | 73/187 |
| 4,555,938 | 12/1985 | Boucher et al. | 73/187 |
| 4,898,029 | 2/1990 | Boucher | 73/187 |
| 4,914,945 | 4/1990 | Nakamura et al. | 73/182 |
| 5,063,381 | 11/1991 | Ito | 440/2 |

FOREIGN PATENT DOCUMENTS 227391 9/1990 Japan ...................... 440/2

Primary Examiner—Michael S. Huppert
Assistant Examiner—Thomas J. Brahan
Attorney, Agent, or Firm—Knobbe, Martens, Olson & Bear

[57] ABSTRACT

An improved speed detecting system for a marine propulsion unit that can be integrated into the unit and which comprises an element driven by water flow contained within the propulsion unit and means for generating a digital electrical signal depending upon the rate of travel.

9 Claims, 2 Drawing Sheets

SPEED DETECTING SYSTEM FOR MARINE PROPULSION UNIT

BACKGROUND OF THE INVENTION

This invention relates to a speed detecting system for a marine propulsion unit and more particularly to an improved speed detector that is integrated into the marine propulsion unit.

Generally there are two types of speed indicators employed in watercraft. One is the so-called propeller type wherein a propeller is submerged from the hull in the body of water in which the hull is operating so as to be driven on the movement of the hull through the water. With this type of device, an electrical analog signal is generated dependent upon the rate of boat movement and this signal is then transmitted to a display in the watercraft. This type of device has several disadvantages.

In the first instance, the propeller must be positioned in a location wherein it will receive the water flow so as to provide an accurate indication of speed. As a result, the device is normally positioned in an area where it can be easily managed. In addition, with this type of device it is difficult to incorporate it directly into the propulsion unit for the watercraft and thus must generally be a separate unit. If it is integrated into the propulsion unit, then still further problems may be encountered.

The other type of speed sensor employed for watercraft includes a dynamic pressure system wherein a pressure sensing port is positioned beneath the body of water in which the watercraft is operating and this receives a dynamic water pressure signal. This type of device can be quite accurate and also has the advantage that it can be easily incorporated into the propulsion unit.

However, this type of device requires a conduit that extends from the pressure sensing port to the speed indicator in the hull. These conduits can be easily bent, kinked or damaged with resulting errors in speed indication.

It is, therefore, a principal object of this invention to provide an improved, simplified speed detecting arrangement for a propulsion unit.

It is a further object of this invention to provide an improved speed detector that can be employed in the propulsion unit for the hull itself.

It is a further object of this invention to provide an improved speed detector that can be incorporated into the propulsion unit and which does not require conduits for delivering fluid pressure to a remotely positioned indicator.

In addition to the problems as aforenoted, a single type of speed indicator generally has certain speed ratios where it has high accuracy and other speed ratios wherein the accuracy may not be as great.

It is, therefore, a still further object of this invention to provide an improved speed detector for a watercraft that has two ranges of operation to provide more accuracy over a wide range of running conditions.

SUMMARY OF THE INVENTION

This invention is adapted to be embodied in a speed detecting system for a marine propulsion unit having an outboard drive portion adapted to be affixed to the transom of a watercraft and having a lower unit that is disposed beneath the water level in which the watercraft is operating and which carries a propulsion device for propelling the watercraft. Contained within the outer unit is a speed detector consisting of an element driven by water flow and conduit means for communicating water from the body of water in which the watercraft is operating to the speed detector and back to the body of water in which the watercraft is operating. Means are provided for generating an electrical signal indicative of the speed of the element and for transmitting that electrical signal to a remotely positioned speed indicator.

DETAILED DESCRIPTION OF THE PREFERRED EMBODIMENTS OF THE INVENTION

Figure 1:
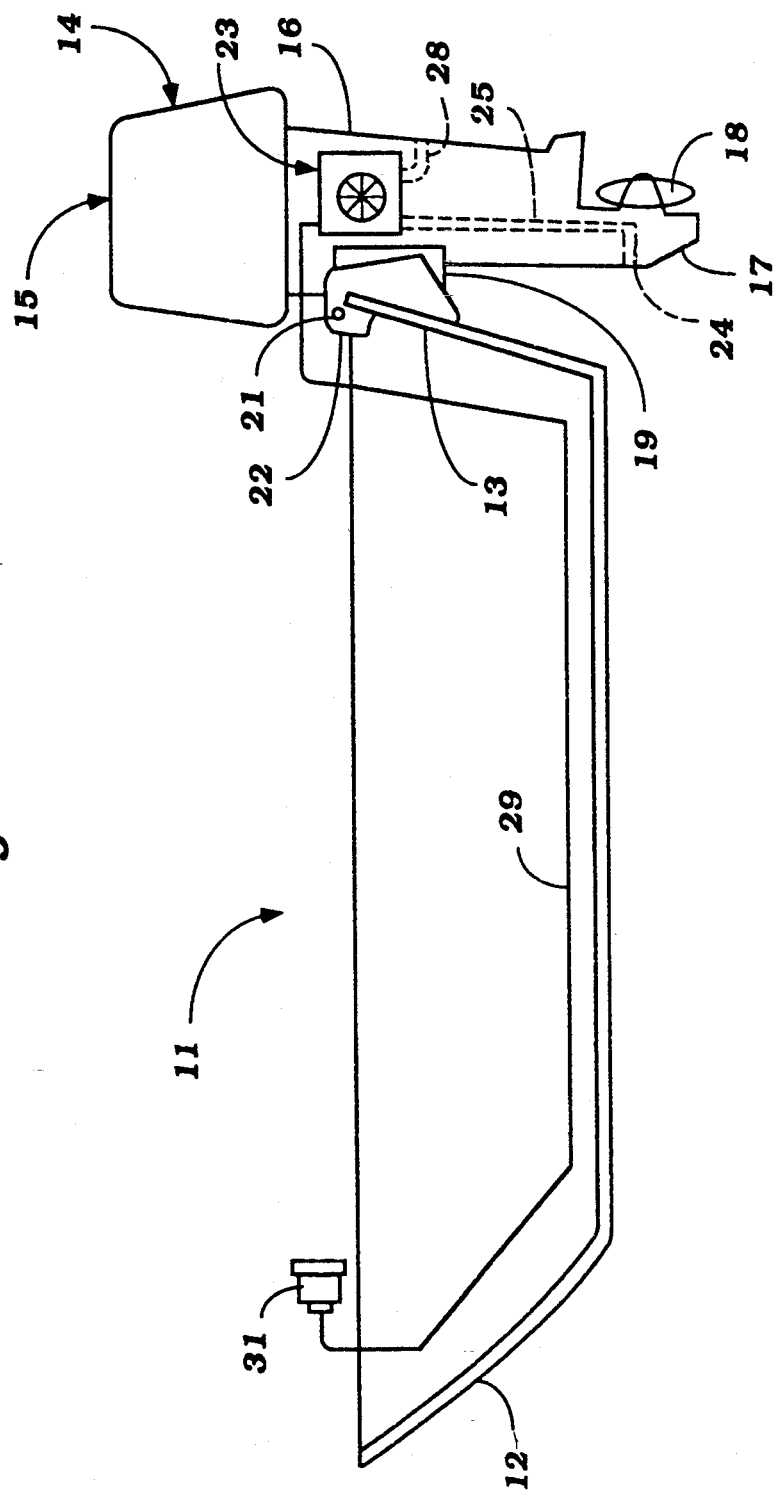
FIG. 1 is a partially schematic side elevational view of a watercraft having a marine propulsion unit with a speed detecting system constructed in accordance with an embodiment of the invention.

Referring now in detail to the drawings and initially to FIG. 1, a watercraft propelled by a propulsion unit including a speed detecting device constructed in accordance with an embodiment of the invention is identified generally by the reference numeral 11. The watercraft 11 includes a hull 12 which may have any known type of configuration and which includes a transom 13 on which a marine outboard drive, indicated generally by the reference numeral 14, and consisting of an outboard motor, in this embodiment, is mounted in a manner to be described.

The term "marine propulsion unit" is employed to designate either an outboard motor or the outboard drive portion of an inboard/outboard drive, either of which is adapted to be constructed in accordance with the embodiments of the invention. The invention, however, has particular utility in conjunction with outboard motors since outboard motors are designed to be attached to the transom of various watercraft and may be moved from watercraft to watercraft, as desired. The fact that the speed detecting unit, to be described, is integrated into the marine outboard drive 14 and specifically the illustrated outboard motor, facilitates this use with other hulls.

The outboard motor 14 includes a power head 15 that contains a powering internal combustion engine of any known type and which is surrounded by a protective cowling. The engine drives a driveshaft that depends into and is rotatably journaled within a driveshaft housing 16. This driveshaft then extends into a lower unit 17 where it drives a propeller 18 through a conventional type of forward/neutral/reverse transmission.

A steering shaft is affixed to the driveshaft housing 16 and is pivotally supported within a swivel bracket 19 for steering of the outboard motor 14 in a well known manner. The swivel bracket 19 is connected by means of a pivot pin 21 to a clamping bracket 22 for tilt and trim movement, as is well known in this art. The clamping bracket 21 is affixed in any known manner to the transom 13 of the hull 12.

In accordance with the invention, a speed detecting unit, indicated generally by the reference numeral 23 and having a construction which will be described, is mounted within the driveshaft housing 16, preferably at a level above the level of water in which the watercraft is operating and in an area where it will not be impinged upon by any water within the driveshaft housing 16.

A flow of water is delivered to the speed detecting unit 23 from a forwardly facing water inlet port 24 formed in the lower unit 17 and positioned preferably below the lower portion of the hull 12. The water inlet port 24 communicates with an internal conduit 25 that delivers water to a water inlet opening passage 26 (FIG. 2) of the sensing device 23. This water then passes across a flow detector element, to be described, and then exits through a discharge port 27 and into a discharge passageway 28 for discharge back into the body of water in which the watercraft is operating. The discharge passage 28 preferably is disposed above the water level.

The speed detecting unit 23 outputs a digital signal indicative of speed through an electrical conduit 29 which extends to a display 31 positioned conveniently within the hull 12 in an area in proximity to the operator. The display 31 converts the digital signals from the speed sensing device 23 to a suitable display which may be either numerical or analog.

Figure 2:
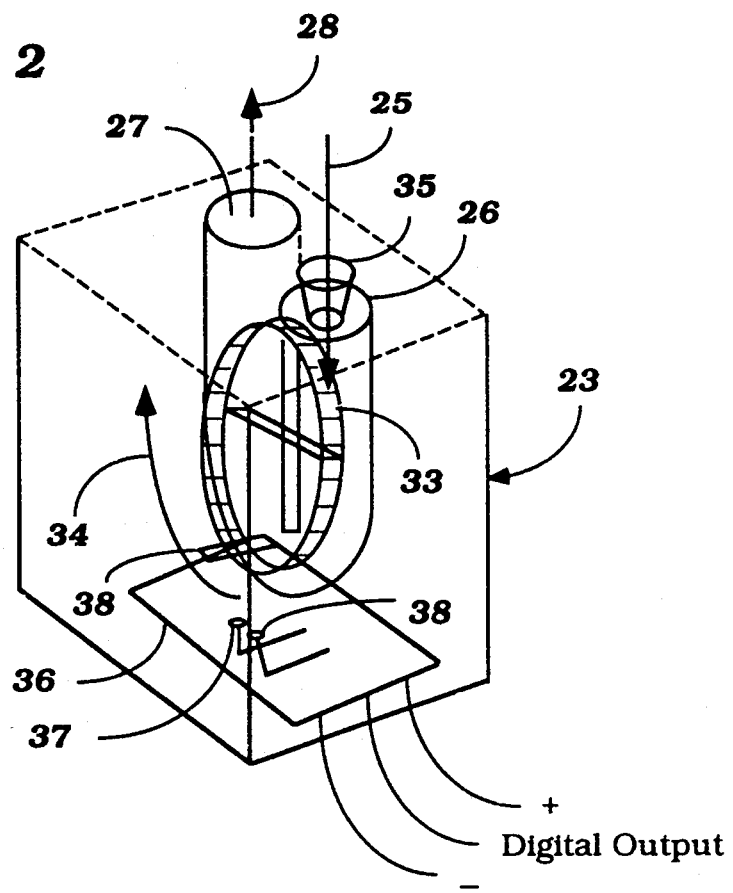
FIG. 2 is an enlarged perspective view of the speed detector.
Figure 3:
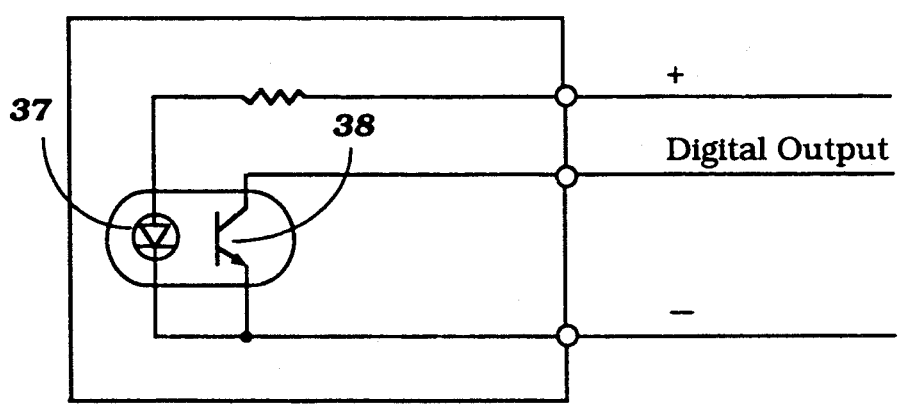
FIG. 3 is an electrical diagram of the speed detector.

Referring now to FIGS. 2 and 3, the speed detector 23 includes an internal water chamber 32 in which a vaned wheel element 33 is rotatably journaled in a suitable manner so that it will be driven in the direction of the arrow 34 upon water flow from the inlet port 26 to the outlet port 27. The speed of rotation will depend upon the dynamic water pressure at the port 24.

If desired, a slidable orifice 35 may be provided which provides greater sensitivity at certain speeds than at other speeds. For example, usually device 23 will be linear at one speed range but at relatively low speeds will become non-linear. By sliding the restricted orifice 35 across the inlet port 26 at low speeds, the velocity will be increased and the sensitivity will be increased. When this is done, the circuitry associated with the display 31 will make an appropriate adjustment for the difference in speed ratio. That is, since the vaned wheel 33 will be driven faster when the orifice 35 is in place than when it is not in place, there will be a speed adjustment made in the display 31 or in the circuitry associated with it so that the device can read accurate speeds under all conditions. The shifting of the orifice 35 can be done automatically in any manner so as to be in its restrictive position at low speeds and in its unrestricted position at high speeds. At the same time, the indicator 31 is shifted between one range at low speeds and another range at high speeds.

The digital signals are derived from a photo coupler that is mounted on a base 36 and which includes a light emitting diode 37 which emits light pulses that pass across the vanes of the wheel 33, and are reflected back by a mirror 38 to a light receiving element 38 which is a photo transistor that will output a signal when it receives light and no signal when the light is obscured by the vanes of the wheel 33. This will thus provide a digital output that is indicative of speed and thus, because of this digital output the device is much less sensitive to noise than propeller type of analog output units. Also, this signal may be easily transmitted to the remotely positioned display 31.

In addition to being more accurate and providing a compact, integrated unit, the output need be transmitted only over a single conductor rather than necessitating a hydraulic conduit.

It is to be understood that the foregoing description is that of a preferred embodiment of the invention and that various changes and modifications may be made without departing from the spirit and scope of the invention, as defined by the appended claims. For example, rather than using a photo coupler for sensing speed, a magnetic sensor may be employed or any other type of device which will preferably give a digital signal.

I claim:

1. A marine propulsion unit having an outer housing containing a lower unit and propulsion device submerged in a body of water in which an associated watercraft is operating for propelling the watercraft, a speed sensor comprising an element driven by the flow of water through said speed sensor contained within said outer housing and above the water level, a pressure receiving port formed in said lower unit below the water level and in a forwardly facing direction for receiving water, conduit means within said outer housing for delivering water from said pressure receiving port to said speed sensor and for delivering water from said speed sensor back to the body of water in which said watercraft is operating, and means for providing a digital electrical output signal in response to the water flow through said speed sensor.

2. A marine propulsion unit as set forth in claim 1 wherein the means for generating the digital electrical signal acts in response to the rotation of the element.

3. A marine propulsion unit as set forth in claim 2 wherein the means for providing a digital signal comprises a photoelectric sensor.

4. A marine propulsion unit as set forth in claim 3 wherein the marine propulsion unit comprises an outboard motor adapted to be mounted on the hull of an associated watercraft.

5. A marine propulsion unit having an outer housing containing a lower unit and propulsion device for propelling an associated watercraft, a speed sensor contained within said outer housing, conduit means for delivering water from a pressure receiving port to said speed sensor and for delivering water from said speed sensor back to the body of water in which said watercraft is operating, means for providing a digital electrical output signal in response to the water flow through said speed sensor, said speed sensor having a first and second range of operation, each offering greater sensitivity dependent upon the water flow, and selectively operable restrictive means for changing the velocity characteristics through the speed sensor in response to the actual speed of travel to provide better speed response.

6. A marine propulsion unit as set forth in claim 5 wherein the speed sensor comprises an element driven by the flow of water through said speed sensor.

7. A marine propulsion unit as set forth in claim 6 wherein the means for generating the digital electrical signal acts in response to the rotation of the element.

8. A marine propulsion unit as set forth in claim 7 wherein the means for providing a digital signal comprises a photoelectric sensor.

9. A marine propulsion unit as set forth in claim 8 wherein the marine propulsion comprises an outboard motor adapted to be mounted on the hull of an associated watercraft.

* * * * *